United States Patent [19]

Hagino et al.

[11] Patent Number: 5,499,913
[45] Date of Patent: Mar. 19, 1996

[54] DEVICE FOR PRODUCING HONEYCOMB STRUCTURAL BODIES

[75] Inventors: Tomiaki Hagino, Nagoya; Mamoru Furuta, Toyoake; Kaname Fukao, Inuyama, all of Japan

[73] Assignee: NGK Insulators, Ltd., Japan

[21] Appl. No.: 141,534

[22] Filed: Oct. 27, 1993

[30] Foreign Application Priority Data

Nov. 26, 1992 [JP] Japan .................. 4-317251

[51] Int. Cl.⁶ .................. B29C 47/10; B29C 47/20; B29C 47/30
[52] U.S. Cl. .................. 425/382.4; 264/177.12; 264/209.8; 425/198; 425/199; 425/382 R; 425/464; 425/DIG. 29
[58] Field of Search .................. 425/197, 198, 425/199, 461, 465, 464, 382 R, 382.4, DIG. 29; 264/177.12, 177.16, 339, 209.8

[56] References Cited

U.S. PATENT DOCUMENTS

| | | | |
|---|---|---|---|
| 3,284,848 | 11/1966 | Rice . | |
| 4,278,412 | 7/1981 | Ozaki et al. | 425/198 |
| 4,364,888 | 12/1982 | Levin | 264/177.12 |
| 4,461,323 | 7/1984 | Morikawa et al. | 138/115 |
| 4,814,187 | 3/1989 | Inoue et al. | 425/198 |

FOREIGN PATENT DOCUMENTS

| | | |
|---|---|---|
| 0275162 | 7/1988 | European Pat. Off. . |
| M 15980 | 1/1956 | Germany . |
| 1504212 | 9/1969 | Germany . |
| 52-78965 | 7/1977 | Japan . |
| 5-131426 | 4/1993 | Japan .................. 264/177.12 |
| 318927 | 3/1957 | Switzerland . |

*Primary Examiner*—Jay H. Woo
*Assistant Examiner*—Joseph Leyson
*Attorney, Agent, or Firm*—Parkhurst Wendel & Rossi

[57] ABSTRACT

A device for producing honeycomb structural bodies, including an a extruding die, and a porous plate provided on a side of an inlet of the extruding die for the molding material, The passage resistance of the molding material through the porous plate is varied in a direction orthogonal to an extruding direction of the molding material.

8 Claims, 4 Drawing Sheets

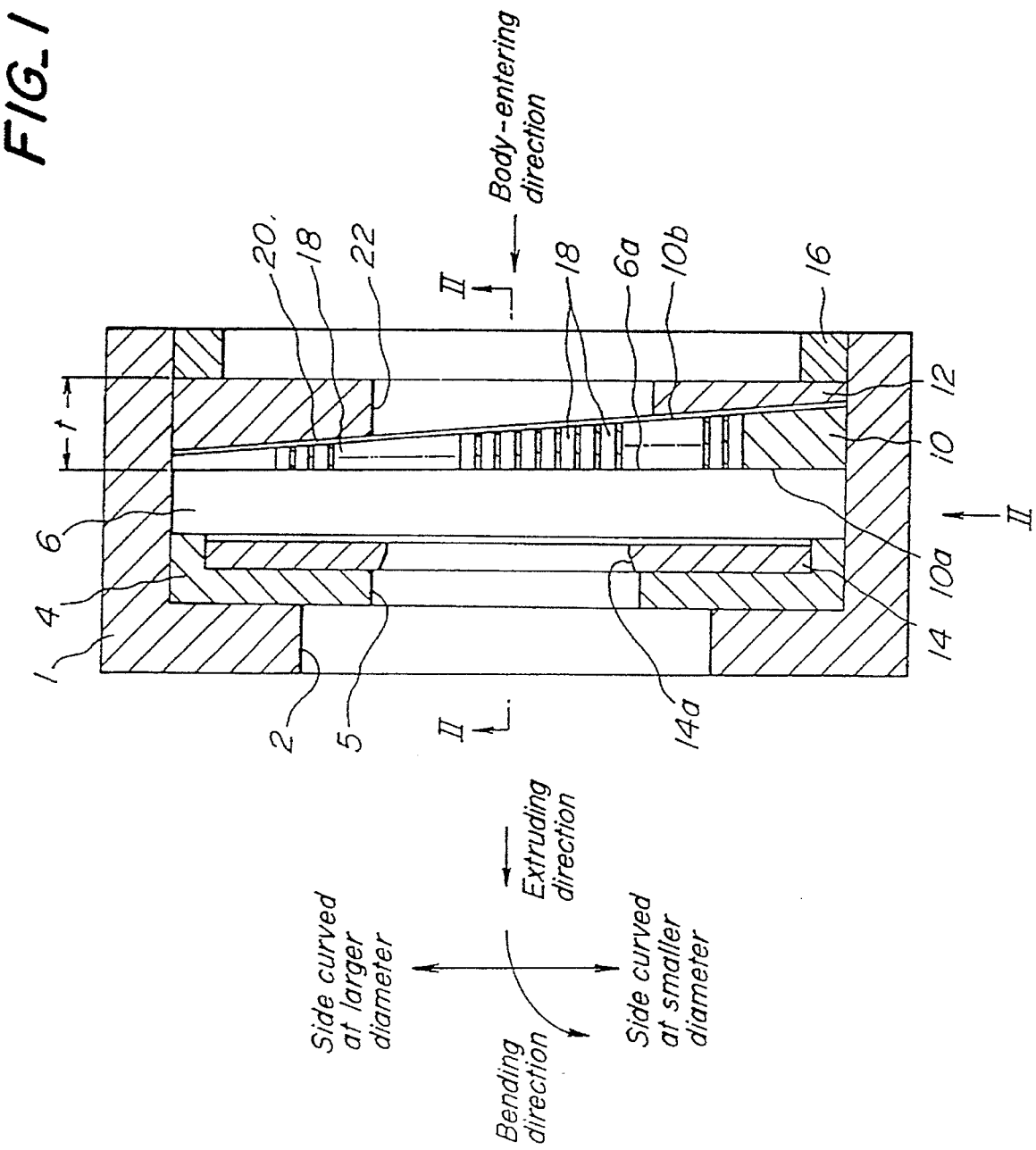

FIG_2
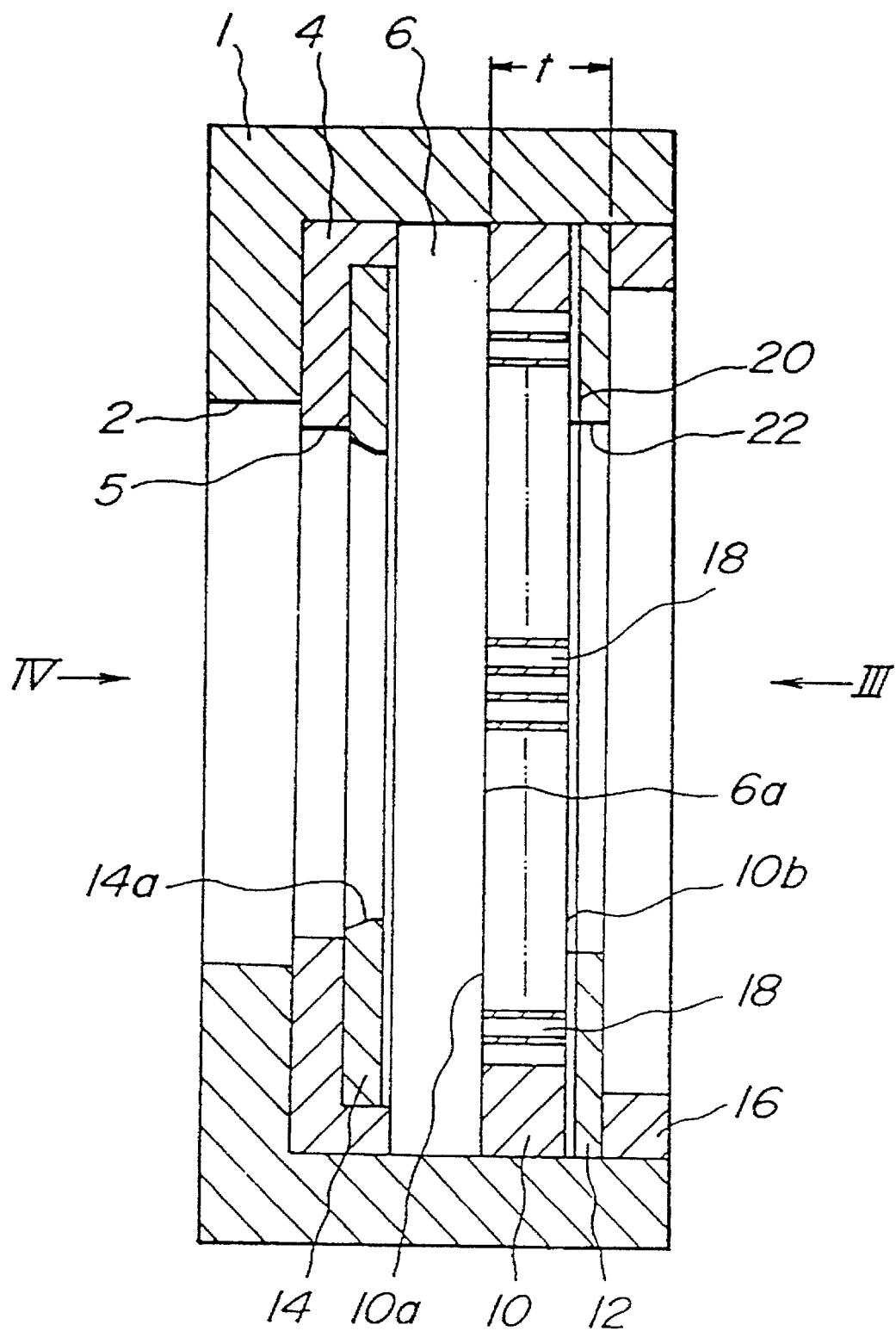

FIG_3
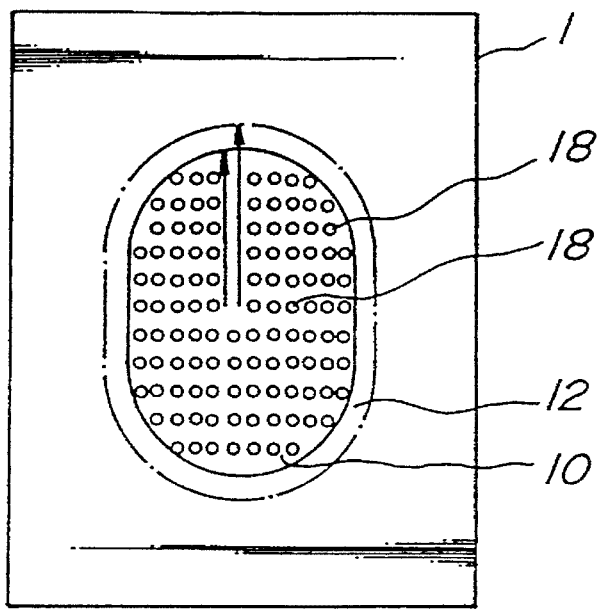
FIG_4
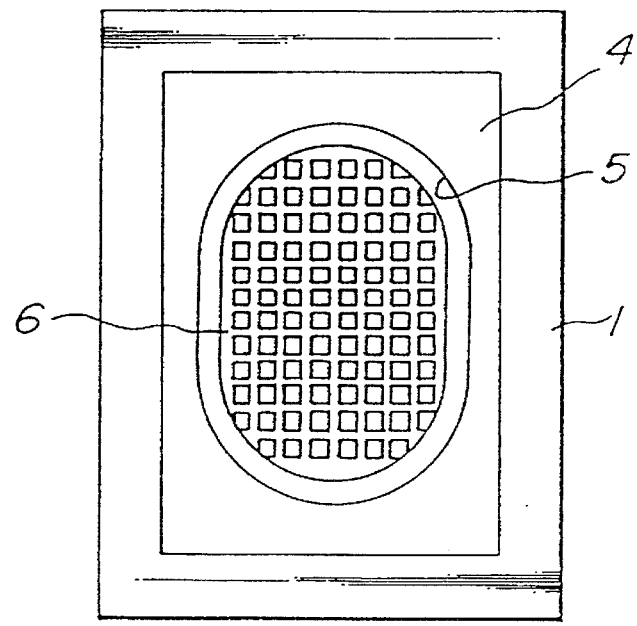

DEVICE FOR PRODUCING HONEYCOMB STRUCTURAL BODIES

BACKGROUND OF THE INVENTION

1. Field of the Invention

The present invention relates to an extruding device for molding honeycomb structural bodies made of a molding material such as a ceramic or a resin. In particular, the invention relates to devices for producing honeycomb structural bodies having curved shapes.

2. Related Art Statement

In general, a plastic molding material such as a ceramic or a resin is passed through a special die of an extruding machine, and is continuously extruded from the die to produce an extruded honeycomb structural body. When the honeycomb structural body is extruded by using such an extruding machine, an extruded body having a straight shape is formed in an extruding direction because the molding is continuously extruded by the molding machine.

For this reason, although extrusion of curved honeycomb structural bodies with use of an extruding machine can be imagined as a concept, it is not easy to extrude a honeycomb structural body having a curved shape in an actual process.

Japanese patent application Laid-open No. 57-78,965 discloses such a process for extruding curved honeycomb structural bodies. In this process, the lengths of passages formed in a die of an extruding machine in the form of a honeycomb are varied, so that the curved honeycomb structural body is formed by utilizing the feature that extruded flow resistance of the molding material becomes greater as the length of the passage increases. In this process, tapered slanting surfaces are formed on respective slit-forming portions of a molding die so that the lengths of the flow passages are variable with such tapered slanting surfaces and that the molding is bent on a side of an extruding outlet, depending upon the magnitude of the flow passage resistance, toward a direction in which the flow passage resistance becomes greater.

However, this conventional process has the following problems.

(1) Since the extruding machine has a structure in which the tapered slanting surfaces are formed on the molding die, it is difficult to work the die, and the actual die-producing process suffers troublesome working steps and results in costly dies.

(2) Since the passed amount of the body becomes non-uniform depending upon the lengths of the passages of the die, the thickness of inner walls of the resulting molding becomes non-uniform, with the result that the moldings obtained are likely to have non-uniformity and poor quality as structural bodies.

(3) The flow rate of the body at the side of the outlet needs to be finely adjusted on molding, but this fine adjustment in the die is difficult when considered from working operation.

(4) Further, in order to obtain different kinds of honeycomb structural bodies having largely differing radii of curvature (R), a plurality of molding dies having different specifications are required, so that it is difficult to obtain curved honeycomb structural bodies having different radii of curvature by using a single molding die.

SUMMARY OF THE INVENTION

The present invention has been accomplished to solve the above-mentioned problems, and is aimed at the provision of a curved honeycomb structural body-producing device for extruding a curved honeycomb structural body by using an extremely simple construction.

Further, in the case of the production of honeycomb structural bodies extruded in a straight form, a die must be freshly prepared when the resulting moldings are extruded in a curved or deformed form due to improper working of the molding die. The present invention is also aimed at the provision of a device for producing honeycomb structural bodies, said device being adapted to correct this problem by a simple method.

In order to solve the above problems, the device for producing honeycomb structural bodies according to the present invention is characterized in that a porous plate is provided on a side of an inlet of a die for a molding material, and the passage resistance of the molding material through the porous plate is varied in a direction orthogonal to an extruding direction of the molding material.

The following are preferable as concrete constructions of the honeycomb structural body-producing device according to the present invention.

(1) The honeycomb structural body-producing device comprises a die having a number of straight through-holes through which the molding material to be extruded in a honeycomb structure is passed, and a porous plate fitted to the side of the inlet of the die for the molding material, said porous plate having a number of straight through-holes penetrating the porous plate in a width direction thereof and an area of passage openings of said straight through-holes is set greater on a side at which a diameter of curving an extruded honeycomb molding is greater than on a side at which a diameter of curving the extruded honeycomb molding is smaller.

(2) The above porous plate has a thickness which increases in a direction from the side at which the diameter of curving the extruded honeycomb molding is greater to the side at which the diameter of curving the extruded honeycomb molding is smaller.

(3) The above area of passage openings of said straight through-holes of the porous plate is set greater than that of passage openings of the straight through-holes of said die.

(4) The honeycomb structural body-producing device further comprises a press plate piled upon an inlet side of said porous plate, said press plate having a thickness made greater in a direction opposite to the direction in which the thickness of the porous plate is increased.

According to the the honeycomb structural body-producing device of the present invention, the curved honeycomb structural bodies can be produced by the simple construction in which the above separate porous plate is additionally provided to the extruding die. Further, in the case of the production of the straight honeycomb structural bodies, when they are extruded in a curved or deformed form, the extruded bodies can be corrected by the above simple construction.

These and other objects, features and advantages of the invention will be appreciated upon reading of the following description of the invention when taken in conjunction with the attached drawings, with the understanding that some modifications, variations and changes of the invention could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a cross-sectional view of an embodiment of an extruding device according to the present invention;

FIG. 2 is a sectional view of FIG. 1 along with a line II—II;

FIG. 3 is a view of the molding device as viewed from an arrow direction III of FIG. 2;

FIG. 4 is a view of the extruding device as viewed from an arrow direction IV of FIG. 2.

DETAILED DESCRIPTION OF THE INVENTION

Figure 5:
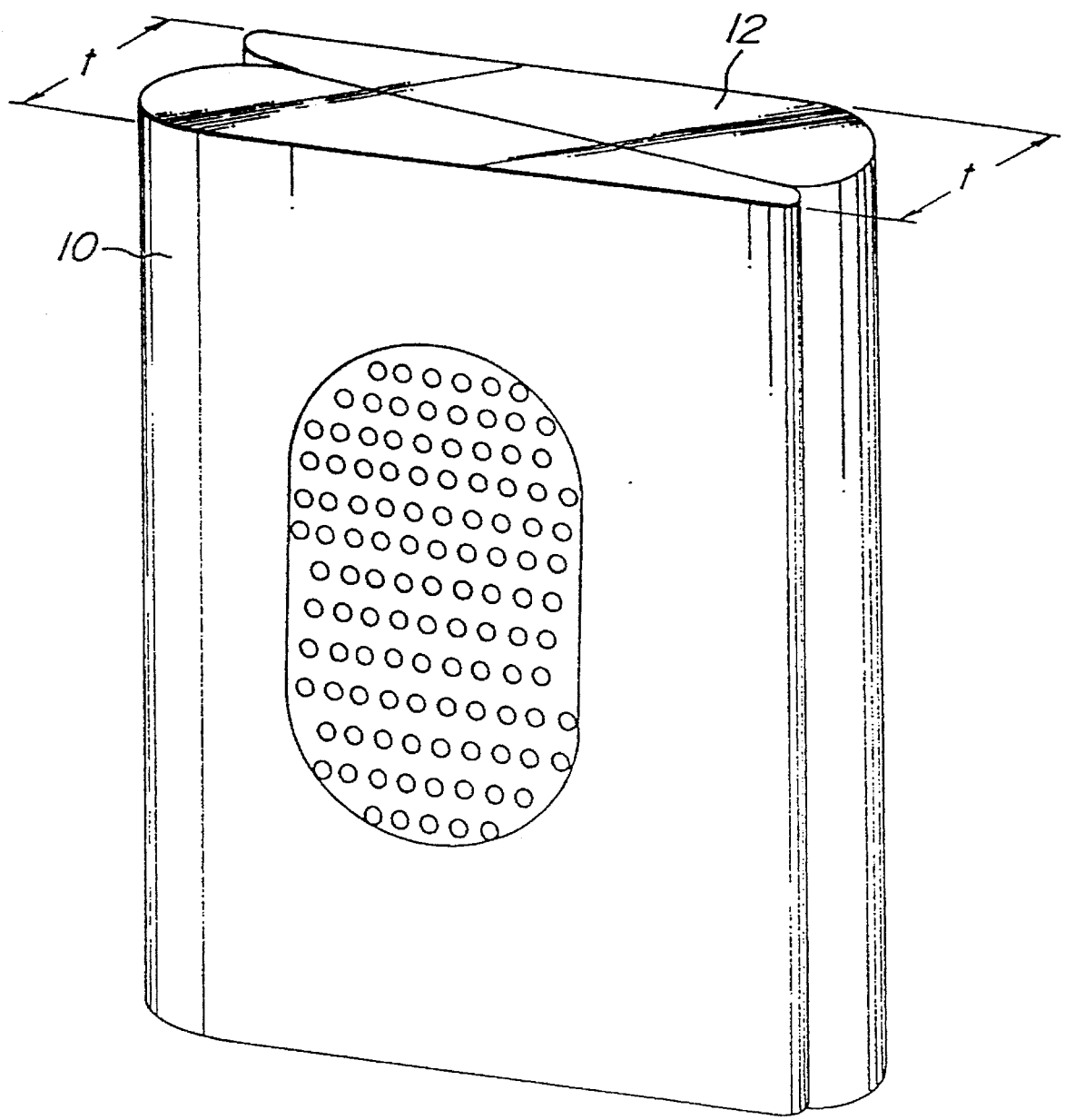
FIG. 5 is a perspective view illustrating the state in which the porous plate is combined with a rear side-pressing plate in the above embodiment.

In the following, an embodiment of the present invention will be explained with reference to the attached drawings.

FIGS. 1 through 5 illustrate an embodiment of the extruding device for extruding curved honeycomb structural bodies. This extruding device is a molding device to be fitted to a body-molding outlet in a molding machine not shown. The extruding device may be also used for correcting a bent deformation in the case of the production of straight honeycomb structural body.

As shown in FIGS. 1 and 2, a first jig 1 having a rectangular outer section is provided with an outlet opening 2 at a front face. A second jig 4 is fitted to an inner side of the jig 1, and the second jig 4 is provided with an opening 5. A die 6 having a well-known honeycomb structure is arranged on a rear side (inlet side) of the second jig 4. A porous plate 10 is arranged on a rear side of the die 6, and a press plate 12 is arranged on a rear side (an inlet face side) of the porous plate 10. The die 6, the porous plate 10 and the press plate 12 are fixed to the jig 1 by means of the second jig 4, a front press plate 14 and a spacer ring 16.

The die 6 is a die for molding the honeycomb structural bodies, and is formed with a number of through-holes penetrating the die in a thickness direction. The through-holes of the die communicate with corresponding through holes of the porous plate. Preferably, the center of each through-hole of the die is aligned with that of the corresponding through-hole of the porous plate. However, the center of each through-hole of the die need not necessarily be aligned with that of the corresponding through hole of the porous plate. It is preferable that the diameter of the through-holes in the porous plate is smaller than that of the through-holes of the die.

As shown in FIG. 1, the porous plate 10 has such a tapered shape as viewed in section that the thickness of the porous plate increases in a direction from a side on which the honeycomb structural body is to be curved in a larger diameter to a side on which the honeycomb structural body is to be curved in a smaller diameter. A front face 10a of the porous plate 10 is a plane orthogonal to a direction in which flow passages extend, and a rear face 10b thereof is a slanting face slanted with respect to the front face 10a, but still generally orthogonal to the flowing passage direction. A number of round section through-holes 18 are formed in the porous plate in a thickness direction thereof. The passage lengths of the through-holes 18 are made longer in a direction from the side on which the honeycomb structural body is to be curved in the larger diameter to the side on which the honeycomb structural body is to be curved in the smaller diameter. By so doing, the flow passage resistance of the porous plate is greater on the side on which the honeycomb structural body is curved in the smaller diameter than on the side on which the honeycomb structural body is to be curved in the larger diameter. Therefore, the flow amount of the body entering the inlet face 6a of the die is greater on the side on which the honeycomb structural body is to be curved in the larger diameter than on the side on which the honeycomb structural body is to be curved in the smaller diameter.

In this embodiment, the through-holes 18 all have the same diameter, and inner walls partitioning the adjacent through-holes 18 have an equal thickness.

A thin spacer 20 is provided on a rear face 10b of the porous plate 10, and a rear press plate 12 is arranged on a rear face side of the spacer 20.

The rear press plate 12 is formed with an opening 22 for allowing the passage of the body. By so doing, the flow rate of the body flowing through the die 6 and the porous plate 10 is controlled.

The spacer ring 16 is arranged on a rear side of the rear press plate 12 in an area extending on a sufficiently radially outer side of the opening 22 of the rear press plate 12. This construction is to prevent reduction in the flow rate of the body flowing in the opening 22.

As shown in FIG. 5, the porous plate 10 and the rear press plate 12 are laminated together through the spacer 20 in a totally uniform thickness "t". This is because the fitting operation of the porous plate 10 and the rear press plate 12 to the jig 1 is improved by setting the total thickness of the porous plate 10 and the rear press plate 12 to "t" over a lateral direction from the right to the left and over a vertical direction from the side on which the honeycomb structural body is to be curved in the larger diameter than on the side on which the honeycomb structural body is to be curved in the smaller diameter. By so doing, the die 6 and the porous plate 10 are easily attached to or detached from the jig 1.

According to the extruding device of this embodiment, the body passes through the opening 22 of the press plate 12 and the through-holes 18 of the porous plate 10, and is extruded through the die 6. The extruded body is discharged to the left side in FIG. 1 through the opening 14a of the front press plate 14, the opening 5 and the opening 2. At that time, since the passage lengths of the through-holes 18 on the side in which the extruded body is to be curved in the larger diameter are shorter, the flow passage resistance of the porous plate 10 on the side in which the extruded body is to be curved in the larger diameter is set smaller. Accordingly, the flow rate of the body is greater on the side on which the honeycomb structural body is to be curved in the larger diameter than on the side on which the honeycomb structural body is to be curved in the smaller diameter. Consequently, the body is extruded in a shape curved from the side on which the honeycomb structural body is to be curved in the larger diameter to the side on which the honeycomb structural body is to be curved in the smaller diameter.

In the illustrated embodiment, an ordinary honeycomb structural body-molding die formerly employed can be used as the die 6. Since the porous plate 10 of which the flow rate is varied is fitted to an inlet side of the die, the curved molding having uniform inner walls can be precisely formed by the above extremely simple construction.

EXAMPLE 1

In order to extrude a curved cordierite-base honeycomb structural body having an outer diameter of 100 mm, a cell wall thickness of 6 mil (150 μm) and a number of cells of 400, a porous plate having a taper angle of 1.3° and a number of through-holes having diameter of 1.4 mm was fitted to just near (on a body-feeding side of) a die for the formation of a honeycomb structural body having an ordinary shape (straight shape), and a body was extruded at an extruding rate of 40 mm/sec, thereby obtaining a curved honeycomb structural extruded body having a radius R of curvature of 300 mm.

Comparative Example 1

In the above curved honeycomb structural body-extruding process, pins, which were used for fine adjustment of the feed rate of the body, were fitted into body-feeding holes of the die at given locations, and the body was extruded at the varied passage rates of the body through the die. As a result, although the extruded body tended to be curved, the radius of curvature was not fixed with the R being largely varied.

EXAMPLE 2

A curved cordierite-base honeycomb structural body having an elliptical sectional shape with a major axis of 120 mm and a minor axis of 90 mm, a cell wall thickness of 10 mil (250 μm) and a number of cells of 300 was extruded by using a porous plate having a tapered cross section given in Table 1. The extruded honeycomb structural body was curved to a side on which the structural body was curved in a smaller diameter. Results are also shown in Table 1. The roughness of the through-holes in the porous plate having the slanted angle of 1.4° was not more than 20 μm, and the roughness of the through-holes of each of the porous plates having the taper angle of 1.0°, 1.2° and 1.6° was further worked to give a surface roughness of about 30 μm.

TABLE 1

| Slanted angle of taper-section | Radius of curvature R (mm) | |
| --- | --- | --- |
| porous plate of rear (°) | Diameter of through-holes = 1.4 mm | Diameter of through-holes = 1.6 mm |
| 1.0 | 1000 | 1100 |
| 1.2 | 400 | 700 |
| 1.4 | 250 | 500 |
| 1.6 | 180 | 300 |

As a result, when the diameter of the through-holes is made greater, it is expected that the passage resistance of the body is lowered to suppress variations in the radius R of curvature of the curved honeycomb structural body which would be provoked due to non-uniform feeding of the body. This demonstrates the excellent extruding principle employed in the present invention.

As explained above, according to the honeycomb structural body-extruding device of the present invention, the curved honeycomb structural bodies can be produced by the extremely simple construction. Furthermore, in the case of the production of the straight honeycomb structural bodies, bending deformation can be corrected by the extremely simple structure.

What is claimed is:

1. A device for producing honeycomb structural bodies from molding material, said device comprising:

an extruding die having a molding material inlet face, a molding material outlet face and a plurality of passages extending in an extruding direction from said inlet face to said outlet face;

a removable porous plate positioned upstream of said inlet face of said extruding die, such that the molding material passes through said porous plate before entering said extruding die, said porous plate having a first end portion and a second end portion opposite to said first end portion, a thickness of said porous plate increasing in a direction from said first end portion towards said second end portion, and means for adjusting resistance to flow of molding material passing through said porous plate, such that the flow resistance is lowest at said first end portion and gradually increases in a direction, substantially perpendicular to the extruding direction, towards said second end portion; and a press plate stacked on an inlet side of said porous plate, said press plate having a thickness which increases in a direction opposite to the direction in which the thickness of said porous plate increases.

2. The device of claim 1, wherein said passages of said extruding die comprise a plurality of straight through-holes through which the molding material to be extruded passes, said porous plate comprises a plurality of straight through-holes extending therethrough in a thickness direction thereof, and an area of passage openings of said straight through-holes extending through said porous plate is greater in said first end portion thereof than in said second end portion thereof.

3. The device of claim 2, wherein said area of passage openings of said straight through-holes extending through said porous plate is greater than that of passage openings of said straight through-holes of said extruding die.

4. The device of claim 1, wherein a total thickness of said porous plate and said press plate is constant in lateral and vertical directions.

5. A device for producing honeycomb structural bodies from molding material, comprising a first jig having a box configuration open at one end thereof and provided with an opening of reduced size at a second, opposed end thereof, and a second jig, a front press plate, an extruding die, a porous plate, a spacer, a rear press plate, and a spacer ring stacked successively inside said first jig in this order from said second end of said first jig at which said opening is provided, each of said second jig, said front press plate, said spacer, said rear press plate and said spacer ring having a central opening for allowing passage of molding material therethrough;

said extruding die comprising a plurality of straight through-holes through which the molding material passes, said porous plate comprising a plurality of straight through-holes extending therethrough in a thickness direction thereof substantially parallel to the extruding direction, said porous plate having a first end portion and a second end portion opposite to said first end portion, a thickness of said porous plate increasing in a direction from said first end portion towards said second end portion, and a thickness of said rear press plate increasing in a direction opposite to the direction in which the thickness of said porous plate increases, and means for adjusting resistance to flow of molding material passing through said porous plate, such that the flow resistance is lowest at said first end portion and gradually increases in a direction, substantially perpendicular to the extruding direction, towards said second end portion.

6. The device of claim 5, wherein an area of passage openings of said straight through-holes extending through said porous plate is greater in said first end portion thereof than in said second end portion thereof.

7. The device of claim 5, wherein said porous plate and said rear press plate are fixed to said first jig by means of said second jig, said front press plate and said spacer ring.

8. The device of claim 5, wherein said area of passage openings of said straight through-holes extending through said porous plate is greater than that of passage openings of said straight through-holes of said extruding die.

* * * * *